United States Patent
Paterson et al.

(10) Patent No.: US 10,831,922 B1
(45) Date of Patent: Nov. 10, 2020

(54) SYSTEM AND METHOD FOR ACCESS CONTROL

(71) Applicant: United Services Automobile Association (USAA), San Antonio, TX (US)

(72) Inventors: Kevin Glynn Paterson, San Antonio, TX (US); Jordan A. Newmark, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 920 days.

(21) Appl. No.: 15/283,990

(22) Filed: Oct. 3, 2016

Related U.S. Application Data

(60) Provisional application No. 62/248,709, filed on Oct. 30, 2015.

(51) Int. Cl.
| | |
|---|---|
| *G06F 21/62* | (2013.01) |
| *G06F 3/01* | (2006.01) |
| *G06Q 20/20* | (2012.01) |
| *G06Q 20/32* | (2012.01) |

(52) U.S. Cl.
CPC .......... *G06F 21/6245* (2013.01); *G06F 3/015* (2013.01); *G06Q 20/206* (2013.01); *G06Q 20/3278* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 5,474,082 A | * | 12/1995 | Junker | A61B 5/0482 128/905 |
| 6,898,299 B1 | * | 5/2005 | Brooks | G06K 9/00 340/5.52 |
| 7,088,234 B2 | * | 8/2006 | Naito | G08B 1/08 340/539.11 |
| 9,449,446 B1 | * | 9/2016 | Mullin | G07C 9/00158 |
| 9,934,634 B1 | * | 4/2018 | Mullin | G07C 9/00158 |
| 2006/0049957 A1 | * | 3/2006 | Surgenor | A61B 5/04001 340/4.1 |
| 2006/0149338 A1 | * | 7/2006 | Flaherty | A61H 1/0255 607/49 |
| 2010/0113898 A1 | * | 5/2010 | Kim | A61B 5/0261 600/310 |

(Continued)

*Primary Examiner* — Fateh M Obaid
(74) *Attorney, Agent, or Firm* — Fletcher Yoder, P.C.

(57) ABSTRACT

The present disclosure relates generally to systems and methods that enable access control for digital objects based on measured physiological signals of a user. A method of operation of a human mind interface (HMI) system includes measuring, via a physiological sensor of a HMI device, a brain pattern of a user while the user retrieves a digital object after training. The method includes identifying, via a processor of the HMI device, the measured brain pattern stored in a memory of the HMI device, and determining, via the processor, the digital object stored in the memory that is associated with the identified brain pattern. The method includes accessing, via the processor, the digital object and retrieving information contained in the digital object and providing, via the processor of the HMI device, the information contained in the digital object to a recipient on behalf of the user.

19 Claims, 2 Drawing Sheets

(56) References Cited

U.S. PATENT DOCUMENTS

| | | | |
|---|---|---|---|
| 2012/0029379 A1* | 2/2012 | Sivadas | A61B 5/0482 600/545 |
| 2012/0191542 A1* | 7/2012 | Nurmi | A61B 5/16 705/14.54 |
| 2013/0229338 A1* | 9/2013 | Sohn | G06F 3/011 345/156 |
| 2015/0073907 A1* | 3/2015 | Purves | G06Q 20/32 705/14.58 |
| 2016/0364723 A1* | 12/2016 | Reese | G06Q 20/202 |

* cited by examiner

SYSTEM AND METHOD FOR ACCESS CONTROL

CROSS REFERENCE TO RELATED APPLICATION

This application claims priority to and the benefit of U.S. Provisional Application No. 62/248,709, entitled "SYSTEM AND METHOD FOR ACCESS CONTROL," filed Oct. 30, 2015, which is hereby incorporated by reference in its entirety for all purposes.

BACKGROUND

The present disclosure relates generally to systems and methods that enable access control for digital objects based on measured physiological signals of a user.

The human nervous system includes a large number of neurons that cooperate with one another to enable mental activities. By analyzing the communications between these neurons while a person performs various tasks, patterns may be observed and associated with particular mental activities and moods of the person. Electroencephalograph (EEG) devices include a number of electrodes that are typically positioned at locations along the scalp and face of a person and can measure patterns of voltage fluctuations that result from electrical communications between the person's neurons. For example, a person connected to an EEG device may have a particular pattern of electrical activity that can be identified when the patient thinks of a particular object, place, movement, or emotion. As such, an EEG device can be utilized as a computer input device, whereby patterns of voltage fluctuations of a user's brain may be translated into computer commands or actions (e.g., mouse movements, keyboard strokes), which is particularly useful for computer users that may not be capable of using traditional computer input devices.

BRIEF DESCRIPTION

Certain embodiments commensurate in scope with the originally claimed subject matter are summarized below. These embodiments are not intended to limit the scope of claimed embodiments, but rather these embodiments are intended only to provide a brief summary of possible forms of the present embodiments. Indeed, the present disclosure may encompass a variety of forms that may be similar to or different from the embodiments set forth below.

In an embodiment, a human mind interface (HMI) device includes at least one physiological sensor configured to measure physiological signals related to the brain activity of a user and memory circuitry configured to store instructions, brain patterns of the user, and digital objects of the user, wherein the brain patterns of the user are linked to the digital objects of the user. The HMI device includes processing circuitry communicatively coupled to the at least one physiological sensor and the memory circuitry and configured to execute the instructions stored in the memory circuitry to cause the processing circuitry to: receive, from the at least one physiological sensor, a measurement of physiological signals related to the brain activity of the user; identify a brain pattern within the brain patterns stored in the memory circuitry that matches the measurement received from the at least one physiological sensor; determine a digital object within the digital objects stored in the memory circuitry that is linked to the identified brain pattern; access the digital object and retrieve information contained within the digital object; and provide the information contained within the digital object to a recipient on behalf of the user.

In an embodiment, a method of operation of a trained human mind interface (HMI) system includes measuring, via a physiological sensor of a HMI device, a brain pattern of a user while the user attempts to retrieve a digital object using the HMI device. The method includes identifying, via a processor of the HMI device, the measured brain pattern stored in a memory of the HMI device and determining, via the processor of the HMI device, the digital object stored in the memory of the HMI device that is associated with the identified brain pattern. The method includes accessing, via the processor of the HMI device, the digital object; retrieving information contained in the digital object; and providing, via the processor of the HMI device, the information contained in the digital object to a recipient on behalf of the user.

In another embodiment, a method of operation of a human mind interface (HMI) system includes measuring, via a physiological sensor of a HMI device, a brain pattern of a user while the user is training the HMI device. The method also includes receiving, from an input device of the HMI device, a selection of a digital object stored in a memory of the HMI device to be associated with the brain pattern. The method further includes storing and associating the brain pattern with the digital object in the memory of the HMI device.

DRAWINGS

These and other features, aspects, and advantages of the present disclosure will become better understood when the following detailed description is read with reference to the accompanying drawings in which like characters represent like parts throughout the drawings, wherein.

Figure 3:
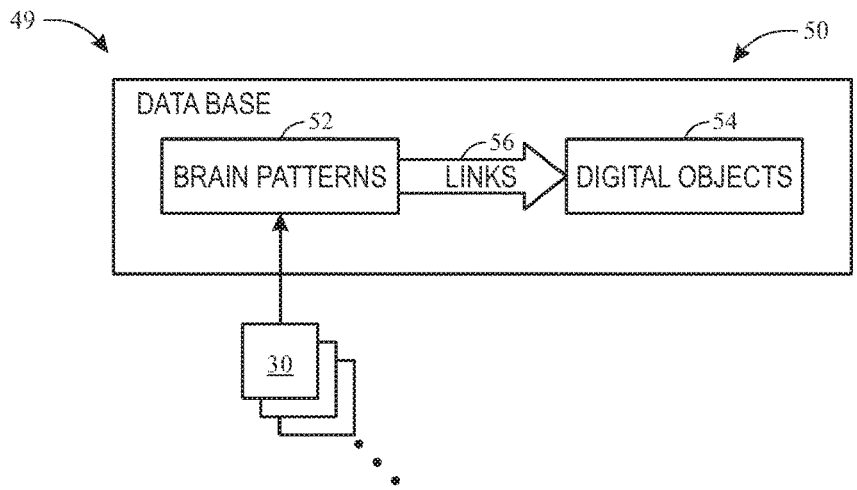
Figure 4:
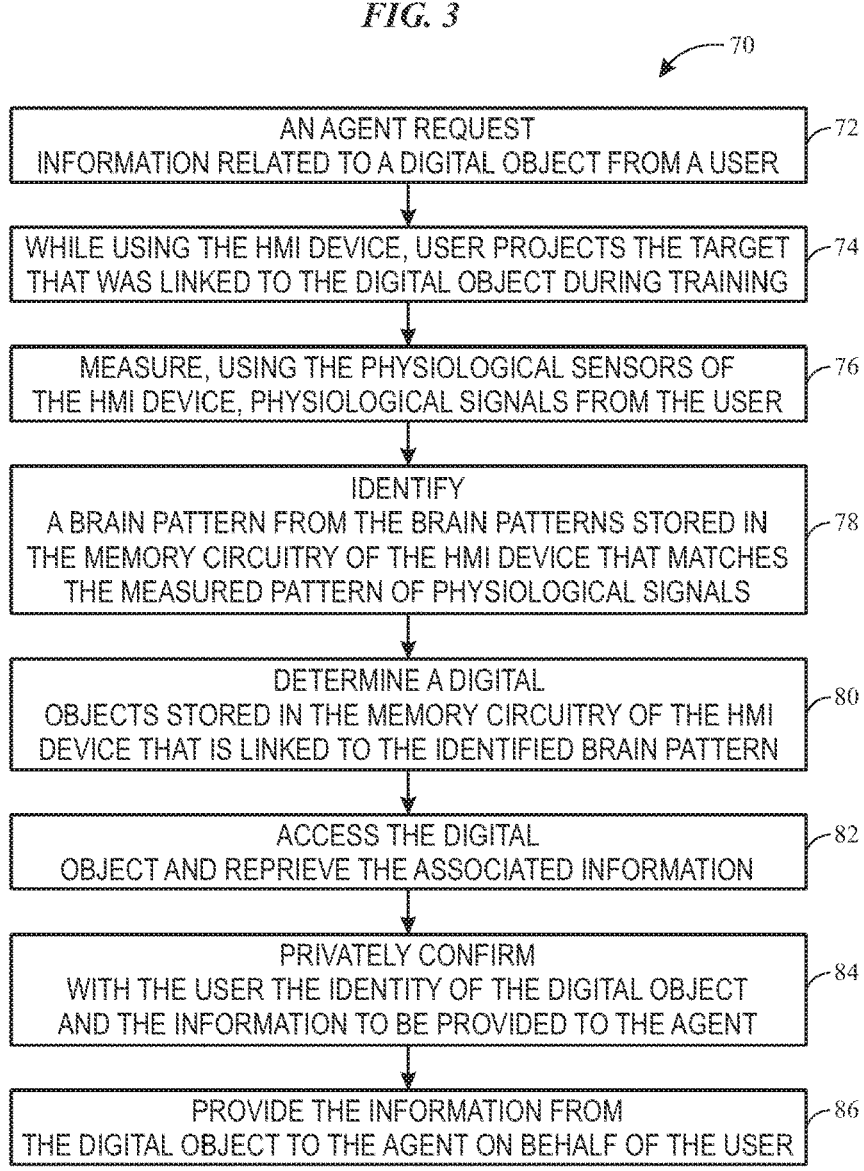

FIG. 3 is a schematic representation of a system including a database that associates measured physiological signal patterns of a user with digital objects, in accordance with embodiments of the present technique; and FIG. 4 is a flow diagram illustrating a method whereby one or more HMI devices may be used to provide information to an agent of a company on behalf of a user, in accordance with embodiments of the present technique.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, a "digital object" refers to digital property of a user that exists as one or more pieces of information, such as user credentials (e.g., user names, passwords, passphrases, personal identification numbers (PINs), encryption keys, activation keys) and user accounts (e.g., name of account holder, account number, expiration date, security code, billing address). While a digital object is a collection of information, it should be noted that digital objects may store information that can be used to access real world locations, such as grant access to enter buildings or vehicles having digital locking mechanism. As used herein, "physiological signals" include any measurable physiological activity that is associated with the operation of a user's brain, including electrical signals (e.g., brain waves), magnetic signals, optical signals, sound signals, chemical signals, and so forth. As used herein, a "brain pattern" refers an identifiable set of measured physiological signals that can be reproduced by user. As used herein, "projecting" refers the action of a user's mind, such as intentionally thinking about (e.g., focusing on, imagining, picturing, recalling) a particular target in order to generate a particular brain pattern. As used herein, a "target" refers to an object, person, place, feeling, or another suitable subject that a user can project to generate a unique brain pattern. As used herein, a "trigger" refers to a particular stimuli (e.g., auditory, visual, tactile) provided by the device to a user to cause the user to project a particular target, such that the corresponding brain pattern of the user may be measured and identified. As used herein, an "agent" refers to a representative person or device that acts on behalf of a company or person (e.g., a salesperson, a customer service representative, a register, a payment system, a website) in the normal course of business.

Present embodiments are directed toward systems and methods that enable access control for digital objects based on measured physiological signals of a user. More specifically, present embodiments provide a system that is trained to associate a user's brain patterns with particular digital objects, and subsequently enables the user to access the digital object by reproducing the particular brain patterns. For example, a digital object that is a password for a website may be associated with a particular brain pattern of the user that is generated and measured when the user projects a target, such as the logo of the company that operates the website. As such, present embodiments enable the user to make use of a digital object by projecting the logo of the company, such that the user need not remember the information of the digital object itself (e.g., the password). Additionally, in certain embodiments, a first user is enabled to grant a second user the ability to associate their own brain pattern with a digital object of the first user, providing the second user revocable access to use the digital object without compromising the information of the digital object itself. Further, as discussed below, present embodiments may enable a user to deliver information of a digital object to another party without the user having to speak or type sensitive information associated with the digital object, thereby improving the privacy and security of the user in public spaces.

Human Mind Interface (HMI) Device

Figure 1:
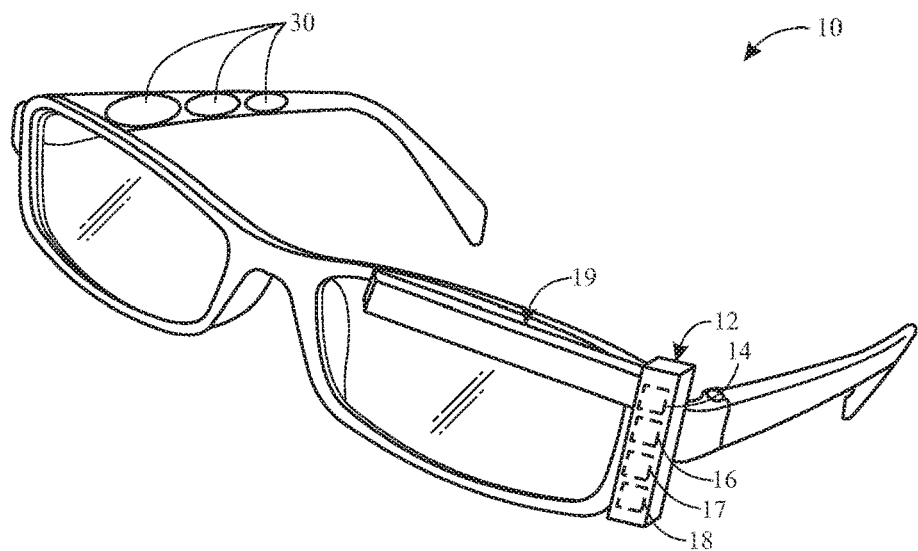
FIG. 1 is a schematic representation of a head-wearable human mind interface (HMI) device, in accordance with embodiments of the present technique.
Figure 2:
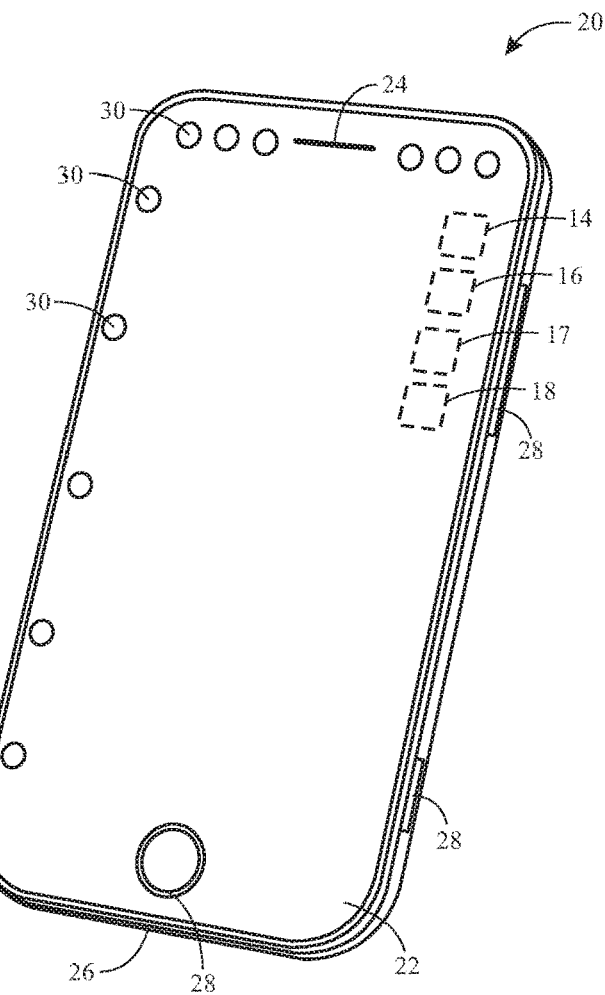
FIG. 2 is a schematic representation of a hand held HMI device, in accordance with embodiments of the present technique.

FIGS. 1 and 2 are perspective views of example embodiments of human mind interface (HMI) devices, in accordance with the present disclosure. More specifically, FIG. 1 illustrates an embodiment of a head-wearable HMI device 10, while FIG. 2 illustrates an embodiment of a hand held HMI device 20. It may be appreciated that these are merely provided as examples and, in other embodiments, other shapes, configurations, and arrangements may be used, in accordance with the present disclosure. In certain embodiments, the HMI device 10 of FIG. 1 may operate in tandem (e.g., via a short-range wireless communication connection) with another electronic device, such as a smartphone, and may utilize one or more components of the smartphone (e.g., processing circuitry, communication circuitry) to provide the disclosed functionality. For example, the HMI device 10 may include one or more sensors that communicate with a smartphone, which processes data from the sensors. While not the case for the illustrated embodiment, in some embodiments, the HMI device 10 may not include a processor configured for such data processing, which may reduce the overall price of the HMI device 10, because a processor in a separate device (such as a smart phone) is utilized.

The HMI devices 10 and 20 illustrated in FIGS. 1 and 2 are specialized computing devices having memory circuitry and processing circuitry generally capable of storing and executing instructions to enable the functionality described herein. For example, the HMI device 10 of FIG. 1 includes a control unit 12 having memory circuitry 14, processing circuitry 16, communication circuitry 17, sensing circuitry 18, and so forth, which enable operation of the HMI device 10. Similarly, the hand held HMI device 20 of FIG. 2 includes memory circuitry 14, processing circuitry 16, communication circuitry 17, sensing circuitry 18, and so forth, disposed within the body of the HMI device 20 that enable its operation. The HMI devices 10 and 20 of FIGS. 1 and 2 are capable of communicating with other devices (e.g., computers, phones, cellular towers, wireless hosts/clients) via short-range and/or long-range wireless communication circuitry, in accordance with the present disclosure. It may be appreciated that the HMI devices 10 and 20 illustrated in FIGS. 1 and 2 may provide additional functionality and have other uses beyond those discussed herein, for example, as communication devices, processing devices, productivity devices, entertainment devices, or other types of devices.

In addition to the aforementioned circuitry, the embodiment of the HMI device 10 illustrated in FIG. 1 includes an augmented reality (AR) projection system 19 that enables images to be presented as overlaying the view of the user. In certain embodiments, the head-wearable HMI device 10 of FIG. 1 may, additionally or alternatively, include features, such as buttons, touch pads, liquid crystal diodes (LEDs), speakers, microphones, haptic feedback mechanisms, positioning systems, and/or other suitable input and output devices, to enable the functionality described below. In addition to the circuitry contained within, the embodiment of the HMI device 20 illustrated in FIG. 2 includes a touch screen 22, speaker 24, microphone 26, and a physical button 28. The number of features (e.g., speakers 24, microphones 26, one or more buttons 28) may vary in different embodiments. In certain embodiments, the hand held HMI device of FIG. 2 may, additionally or alternatively, include features such as fingerprint readers, light emitting diodes (LEDs), cameras, three-dimensional projection systems, haptic feedback mechanisms, positioning systems, and/or other suitable input and output devices to enable the described functionality.

Additionally, the HMI devices 10 and 20 of FIGS. 1 and 2 include one or more physiological sensors 30 that are capable of measuring physiological signals of the user. More specifically, the physiological sensors 30 of the illustrated HMI devices 10 and 20 are designed to contact a portion of the user's head (e.g., scalp, face) to measure physiological signals associated with the operation of the user's brain. For example, the head-wearable HMI device 10 of FIG. 1 can be worn such that the physiological sensors 30 are positioned along a portion of the user's scalp. The hand held HMI device 20 of FIG. 2 may be temporarily positioned against a portion of the user's face, similar to how a phone is positioned for a private call, such that the physiological sensors 30 are positioned along the face and/or scalp of the user. For the illustrated embodiments, the physiological sensors are electroencephalography (EEG) electrodes that are capable of measuring voltage fluctuations that result from the activity of the user's brain. In other embodiments, the physiological sensors of the HMI device 10 or 20 may include or be coupled to magnetic field sensors, sound sensors, light sensors, chemical sensors, or any other physiological sensors (e.g., invasive or non-invasive) suitable for measuring physiological signals that correlate with the activity of the user's brain. These physiological sensors 30 may be capable of converting measured changes in the physiological signals of the user into electrical signals that can be interpreted and identified as a brain pattern by the processing circuitry 16 of the HMI device 10 or 20 (or a separate device used for processing such data). It should be noted that examples are discussed in the present disclosure with respect to the HMI devices 10 and 20 including integral processing circuitry. However, it should be understood that, in certain embodiments, the actual processing circuitry is resident on a separate device (e.g., a smartphone, laptop, desktop) in communication with the HMI device 10 or 20. Thus, reference to processing by the HMI devices 10 and 20 in following examples could also be done with separate processing devices.

Training the HMI Device

The processing circuitry 16 of the HMI devices 10 and 20 (or other processing circuitry configured to receive data from the HMI devices 10 and 20) illustrated in FIGS. 1 and 2 is capable of receiving measurements from the physiological sensors 30, determining a brain pattern from the measured physiological signals, and associating the pattern with a digital object during training. FIG. 3 illustrates a schematic of a system 49 including an embodiment of a database 50, which may be stored in a device configured to communicate with the HMI device 10 or 20 or in the memory circuitry 14 of the HMI device 10 or 20 itself. The database 50 (which may be located in a cloud, remotely or on the device 10 or 20 itself) may be populated during user training of the HMI device 10 or 20. It may be appreciated that the database 50 illustrated in FIG. 3 is only provided by way of example, and that in other embodiments, data may be stored and accessed using other data structures, such as hash tables or linked lists, for improved performance.

The example database illustrated in FIG. 3 includes a table of learned brain patterns 52, a table of stored digital objects 54, and a collection of links 56 associating the learned brain patterns and the stored digital objects of the two tables. It may be appreciated that the links 56 may be stored separately, as a stand-alone data structure, or stored as one or more fields of the other tables. For example, in certain embodiments, the database 50 may be a relational database, and the links 56 may be reference fields (e.g., pointers, key values) that correlate each unique brain pattern stored in the brain pattern table 52 with a particular digital object stored in the digital object table 54. In certain embodiments, the digital objects may be stored in the digital object table 54 in an encrypted manner (e.g., using an encryption key of the user or using a digest or hash of a particular brain pattern).

During training, the user first provides the HMI device 10 or 20 with the details of the digital object, such as a string of characters that is a password of a particular website, or the account details of a particular credit card account of the user. Since the user need not remember the actual information associated with the digital object, this enables the use of, for example, lengthy, complex, randomized passwords, which are advantageous from a security perspective, but difficult for most to remember and use in the absence of the present system. The various pieces of information of the digital object may be assigned to categories (e.g., username, account number, password) to enable selective access, as discussed below. For embodiments in which at least a portion of the information of the digital object is stored on an Internet-accessible server (so that others may access the digital object, as discussed below) the locally stored digital object may only include details for accessing the actual digital object from the server (e.g., hyperlink, password, key).

After creating the digital object, the user may be prompted to select a target that will generate a distinct brain pattern that is recognizable by the processing circuitry 16 while the one or more physiological sensors 30 are positioned to measure the generated signals as the user projects the target. In certain embodiments, the user may choose to have the HMI device 10 or 20 prompt the user with a particular trigger (e.g., sound, picture, or tactile sensation) that, in response, elicits a particular brain pattern in the user. For example, the user may select an image from a group of preselected images that the user mentally relates to a particular digital object (e.g., a password for a website), and the HMI device 10 or 20 may identify and associate the corresponding brain pattern of the user with the digital object while the user is viewing the image. Subsequently, this image may be used as a prompt to provoke the user to generate the brain pattern associated with the digital object. Additionally, during training, the HMI device 10 or 20 may collect the brain pattern of the user a number of times as the user projects the target to ensure that the identified pattern is stable and reproducible.

In certain embodiments, the training process for associating brain patterns with particular digital objects can also be initiated when requested by an agent of a company. For example, when a user forgets their authentication credentials (e.g., password, PIN) or does not have authentication credentials for a service or feature provided by the company, the user may be asked a series of questions by the agent to confirm the identity of the user. After confirming the identity of the user, a digital object (e.g., a password or key) may be generated by the agent on the users behalf, and then the agent may prompt the user to project a particular target (e.g., think about a particular image) such that the HMI device 10 or 20 can measure the corresponding brain pattern and associate the brain pattern with the newly created digital object. For such embodiments, the user does not know and does not need to know the actual password that is stored as a digital object in the database 50. Further, the generated password of the new digital object may be completely different from other passwords that the user may use to access other services or features of the company.

Using the HMI Device

Once training is complete, then the database of FIG. 3 may include at least one digital object 54 that has been linked to (e.g., associated with) a particular brain pattern 52 of the user. Then, during normal use, the HMI devices 10 and 20 of FIGS. 1 and 2 may use the physiological sensors 30 to determine a brain pattern of a user as a user projects a target, and may determine that the user is accessing the linked digital object. For certain embodiments, a trigger may only be used during training to help the user form a target, while in other embodiments, the same trigger may once again be used to prompt the user to project the target during normal use. For other embodiments, the trigger may only be provided to the user at certain times, similar to a password recovery prompt, when the user is having issues projecting the target after multiple attempts without the aid of the trigger used during training.

FIG. 4 is a flow diagram of an embodiment of a method 70 of using an HMI device, after training, to access a digital object. In particular, the method of FIG. 4 is presented along with an example involving a user placing a phone call in a public space (e.g., a restaurant, air port, subway) using an embodiment of the HMI device 20 of FIG. 2 to speak with an agent, such as representative of a company with which the user conducts business, or some other desired person. As illustrated in FIG. 4, during an exchange with the agent, the agent requests (block 72) information related to a digital object from the user. In the example, during the phone call, the user is prompted to provide a confidential password to confirm his or her identity to the agent. Since the user does not want nearby ears to overhear the password, the user instead relies on the functionality provided by the disclosed HMI device 20 to access and deliver the password, stored as information within a digital object, to the representative.

To do so, when the HMI device 20 is suitably positioned for measurement, the user projects (block 74) the target that was linked to (e.g., associated with) the digital object during training, as described above. In certain embodiments, the user may first press a button 28, provide input via the touch screen 22, speak a particular key phrase (e.g., "activate HMI") into the microphone 26, hold the device 20 in a particular position (e.g., near the head of the user), or provide another suitable input to activate the physiological sensors 30 of the HMI device 20. In other embodiments, the HMI device 20 may be capable of actively monitoring the brain patterns of the user throughout the call such that the user has only to project the target at any time to cause the HMI device 20 to retrieve the digital object. In certain embodiments, the HMI device 20 may prompt the user to project the target, for example, in response to activating the physiological sensors 30 of the HMI device 20. In other embodiments, the representative may provide a remote signal to the HMI device 20 to cause the HMI device 20 to prompt the user to project the target. In certain embodiments, this prompt may be or may include a particular trigger associated with the digital object during training.

Accordingly, with or without prompting, the user projects (block 74) the target that is associated with the digital object while using the HMI device. For the example, the user projects the logo of the company that manages the account for which access is desired. Meanwhile, the physiological sensors 30 of the HMI device 20 measure (block 76) the physiological signals of the user. Subsequently, the processing circuitry 16 of the HMI device 20 identifies (block 78) a particular brain pattern from the brain patterns stored in the memory circuitry 14 that matches (overlaps to a threshold degree) the measured physiological signals. Then, the processing circuitry 16 of the HMI device 20 determines (block 80) the digital object stored in the memory circuitry 14 that is linked to (e.g., associated with) the identified brain pattern. Further, the processing circuitry 16 accesses (block 82) the information associated with the digital object. For example, in certain embodiments, accessing the information may involve retrieving at least a portion of the information from an Internet-accessible server (e.g., using data stored in the locally stored digital object table 54), decryption (e.g., using a key stored in the memory circuitry 14, a hash or digest of a brain pattern of the user), or other suitable processes.

Before continuing, in certain embodiments, the HMI device 20 may privately confirm (block 84) with the user the identity of the retrieved digital object, and which particular information is to be provided to the agent. In the example, the HMI device 20 may temporarily mute the call and provide the user with a private prompt (e.g., an auditory prompt via the speaker 24, a visual prompt via the AR projection system 19) indicating which digital object has been selected for transmission, indicating that the information to be sent is a password, and asking the user whether or not to proceed. In certain embodiments, the user may provide input via a spoken command into the microphone 26, a press of a button 28, a physical gesture, a selection of the touch screen 22, or projecting a target brain pattern previously trained for providing a general yes or no input. For embodiments in which the digital object includes multiple pieces of information (e.g., credit card account, health insurance account), the HMI device may privately prompt the user (e.g., visually or auditorily) as to which particular pieces of information of the digital object should be sent to the representative. Further, for increased privacy, the prompt and the user's reply may include only the categories of the information of the digital object (e.g., "credit card number", "user name", "password") that are to be sent, such that the actual information need not be visually or auditorily presented to the user to be potentially compromised by nearby eyes or ears.

Further, as illustrated in FIG. 4, the HMI device 20 subsequently provides the desired information from the digital object to the representative or some other designated party. In certain embodiments, the HMI device 20 may provide the information to the representative or party via the existing communication channel (e.g., auditorily over the phone call), without the user having to speak or type the information. In certain embodiments, the information of the digital object may not ever be locally presented (e.g., auditorily or visually) by the HMI device 20 for a bystander, or even the user, to observe, rather the information is provided directly to the agent or party. For enhanced security, in certain embodiments, the HMI device may communicate the requested information from the digital object via a separate communication channel (e.g., an encrypted digital communication channel), so that, even if the call were to be compromised, the sensitive information of the digital object might remain secure.

Additionally, in certain embodiments, digital object information (e.g., a password, a key, an account number) may be stored across a group (e.g., a set, array, collection) of two or more digital objects. For such embodiments, during training of the HMI device 10 or 20, the user may have an option to store a piece of digital object information across a group of digital objects, and may then associate a different brain pattern with each individual digital object of the group. Subsequently, the user may retrieve the digital object information by projecting, in series, targets that generate the brain patterns associated with each of the digital objects of the group, such that the HMI device 10 or 20 may retrieve and assemble the digital object information to be provided the user or agent in a suitable manner.

Additionally, in certain embodiments, the HMI device 20 may enable other useful access control of digital objects. For example, a first user may grant a second user (e.g., of the same or of another HMI device) access to use a digital object of the first user without having to divulge the details of the digital object itself. For example, in certain embodiments, the digital objects may be centrally stored on an Internet-connected server, and the local table of stored digital objects 54, as illustrated in FIG. 3, may include information (e.g., hyperlinks, encryption keys, reference identifiers) to access the information from the Internet-connected server. As such, the first user may grant the second user access to create a link 56 to a digital object that is centrally stored on such an Internet-connected server, and the level of access granted may determine how the second user may use the digital object of the first user.

For example, in certain embodiments, a first user may allow the information associated with the digital object to be provided or only be provided on behalf of a second user. In this case, the second user would not have direct access to retrieve the digital object, nor have direct access to the information associated therewith. The second user would train the HMI device 10 or 20 as discussed above, with the difference being the information stored in the digital object table 54 instead points to the digital object of the first user (e.g., using a hyperlink, access code, key, or other information provided by the first user). If the example digital object is a credit card account, the first user could therefore grant the second user the ability to access the digital object using the second user's own HMI device. In certain embodiments, when the HMI device of the second user requests and receives the digital object from the server, rather than channel the information through the second user, the HMI device can directly provide the information to the intended recipient, such as merchant payment device, via near-field communication (NFC), Bluetooth, or another suitable wireless communication technology. In other embodiments, when the second user attempts to access the digital object on the server, the HMI device of the second user may indicate to the server the identity of the requesting merchant. For such embodiments, the server may directly provide the information of the digital object to the merchant (e.g., via a separate network connection), rather than channel the information of the digital object through the HMI device of the second user at all. It may be appreciated that, because of the nature of the relationship, removing the link 56 between the brain pattern of the second user and the digital object of the first user effectively revokes the rights of the second user to access the digital object, and the particular information of the digital object need not be compromised. Thus, the first user can effectively provide access through the use of a password without divulging the password itself.

It may be further appreciated that this delegating of access may be quite useful in managing family events. For example, in a case where a user desires to manage the accounts of an ailing relative, access to a collection of digital objects may be quickly and easily granted. Similarly, controlled access may be easily granted and revoked for spouses, children, friends, and extended family. Furthermore, if an ailing relative were to pass, the user can retain access to these digital objects after being granted initial access and linking to them, instead of the collection of digital objects being scattered and lost for lack of the ability to reproduce the brain patterns of the deceased. Indeed, in certain embodiments, permanent links may be created for such situations (e.g., death, power of attorney, loss of mental faculty) to prevent the orphaning of digital objects.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A human mind interface (HMI) device, comprising:
at least one physiological sensor configured to measure physiological signals related to the brain activity of a user;
memory circuitry configured to store instructions, brain patterns of the user, and digital objects of the user, wherein the digital objects comprise authentication credentials, and wherein the brain patterns of the user are linked to the digital objects of the user; and
processing circuitry communicatively coupled to the at least one physiological sensor and the memory circuitry and configured to execute the instructions stored in the memory circuitry to cause the processing circuitry to:
while the user is training the HMI device:
measure, via the at least one physiological sensor, a first measurement of physiological signals related to a brain pattern of the user;
receive, from an input device of the HMI device, a selection of a digital object to be associated with the brain pattern; and
store and link the brain pattern with the digital object in the memory of the HMI device; and
after the user has trained the HMI device:
receive, from the at least one physiological sensor, a second measurement of physiological signals related to the brain activity of the user;
identify the brain pattern within the brain patterns stored in the memory circuitry that matches the second measurement received from the at least one physiological sensor;
determine the digital object comprising an authentication credential within the digital objects stored in the memory circuitry that is linked to the identified brain pattern;
access the digital object and retrieve information contained within the digital object, wherein the information comprises the authentication credential; and
provide at least a portion of the information contained within the digital object, including the authentication credential, to a recipient on behalf of the user.

2. The HMI device of claim 1, wherein the HMI device is a head-wearable HMI device or a hand held HMI device, and wherein the at least one physiological sensor comprises an electroencephalograph (EEG) sensor.

3. The HMI device of claim 1, wherein the HMI device comprises a speaker, a display, an augmented reality (AR) projection system, a haptic feedback mechanism, a microphone, a button, a touchscreen, or a combination thereof.

4. The EMI device of claim 1, wherein the information contained within the digital object comprises a password or access code.

5. The HMI device of claim 1, wherein the information contained within the digital object comprises credit card or bank account information.

6. The HMI device of claim 1, wherein the HMI device comprises communication circuitry configured to establish a communication channel with a device of the recipient, wherein the communication circuitry comprises wireless or near-field communication (NFC) communication circuitry configured to wirelessly establish the communication channel with the device of the recipient.

7. The HMI device of claim 6, wherein the device of the recipient is a point of sale (POS) device.

8. A method of operation of a human mind interface (HMI) device, comprising:
    measuring, via a physiological sensor of the HMI device, a first measurement of first physiological signals related to a first brain pattern of a user;
    receiving, from an input device of the HMI device a selection of a digital object to be associated with the first brain pattern, wherein the digital object comprises an authentication credential;
    storing, via a processor of the HMI device, the first brain pattern and linking the first brain pattern with the digital object in a memory of the HMI device;
    after linking the first brain pattern with the digital object, measuring, via the physiological sensor of the HMI device, a second measurement of second physiological signals related to a second brain pattern of the user while the user attempts to retrieve the digital object using the HMI device;
    identifying, via the processor of the HMI device, the first brain pattern stored in the memory of the HMI device from the second measurement of the second physiological signals;
    determining, via the processor of the HMI device, the digital object that is linked with the first brain pattern;
    accessing, via the processor of the HMI device, the digital object and retrieving information contained in the digital object, wherein the information comprises the authentication credential; and
    providing, via the processor of the HMI device, the authentication credential of the digital object to a recipient on behalf of the user.

9. The method of claim 8, wherein accessing comprises accessing the digital object from a remote server using information stored in the memory of the HMI device.

10. The method of claim 8, wherein accessing comprises:
    providing, via an output device of the Mil device, a prompt to the user to confirm the digital object to be provided to the recipient; and
    receiving, via the input device of the device, a selection confirming the digital object to be provided to the recipient.

11. The method of claim 10, wherein the prompt identifies categories of the information contained within the digital object, and wherein the selection comprises a selection of the categories of the information contained within the digital object to be provided to the recipient.

12. The method of claim 8, comprising:
    establishing, via communication circuitry of the HMI device, a communication channel between the HMI device and a device of the recipient, wherein the user and the recipient communicate with one another via the communication channel, wherein the authentication credential is delivered to the recipient via the communication channel.

13. The method of claim 12, comprising:
    establishing, via the communication circuitry of the HMI device, a separate communication channel between the HMI device and the device of the recipient to provide the authentication credential to the recipient, and wherein the separate communication channel is an encrypted, digital communication channel.

14. The method of claim 8, wherein providing comprises displaying the authentication credential on an output device of the HMI device so that the recipient can view the authentication credential from the output device of the before providing the authentication credential to the recipient.

15. The method of claim 8, wherein measuring the brain pattern of the user while the user is attempting to retrieve the digital object comprises providing, via an output device of the HMI, a trigger that is associated with the digital object in the memory of the HMI device before measuring the brain pattern of the user, wherein the trigger is auditory, visual, or tactile.

16. A non-transitory, computer-readable medium, comprising instructions that are executable by a processor of a human mind interface (HMI) device, wherein the instructions comprise instructions to:
    while a user is training the HMI device:
        signal a physiological sensor of a HMI device to measure a first measurement of first physiological signals related to a first brain pattern of the user;
        receive, from an input device of the HMI device, a selection of a digital object to be associated with the first brain pattern, wherein the digital object comprises an authentication credential; and
        store the first brain pattern and link the first brain pattern with the digital object in a memory of the HMI device; and
    after the user has trained the HMI device:
        signal the physiological sensor of the HMI device to measure a second measurement of second physiological signals related to the second brain pattern of the user while the user attempts to retrieve the digital object using the HMI device;
        identify, in the memory of the HMI device, the digital object that is linked with the measured second brain pattern;
        access the digital object and retrieve the authentication credential contained in the digital object; and
        provide the authentication credential to a recipient on behalf of the user.

17. The medium of claim 16, wherein the instructions to measure the first brain pattern of the user while the user is training the HMI device comprises instructions to:
    provide, via an output device of the HMI, a trigger that is associated with the digital object in the memory of the HMI device before measuring the first brain pattern of the user, wherein the trigger is auditory, visual, or tactile.

18. The medium of claim 16, wherein the digital object is stored remotely on an Internet-connected server, and wherein the instructions comprise instructions to:
    receive, from the input device of the HMI device, a selection to grant a second HMI device permission to associate an additional brain pattern of a second user of the second HMI device with the remotely stored digital object.

19. The medium of claim 16, wherein the digital object is stored remotely on an Internet-connected server, and wherein the instructions, comprise instructions to:
    receive, from the input device of the HMI device, a selection to revoke the permission of the second HMI device and remove the association between the additional brain pattern of the second user and the remotely stored digital object.

* * * * *